UNITED STATES PATENT OFFICE

2,431,756
TREATMENT OF TERPENIC HYDROCARBONS

Vladimir N. Ipatieff and Herman Pines, Chicago, Ill., assignors to Universal Oil Products Company, Chicago, Ill., a corporation of Delaware No Drawing. Application February 28, 1945, Serial No. 580,289

7 Claims. (Cl. 260—668)

This invention relates to a process for converting monocyclic olefinic hydrocarbons into substantial yields of aromatic hydrocarbons. More particularly, the process relates to the production of alkyl aromatic hydrocarbons by the action of particular catalysts upon monocyclic terpenic hydrocarbons.

An object of this invention is to convert unsaturated cyclic hydrocarbons into a substantial yield of aromatic hydrocarbons.

A further object of this invention is to produce cymene and methyl isopropyl cyclohexene by reacting limonene in the presence of a selected halide catalyst.

One specific embodiment of the present invention relates to a process which comprises reacting a monocyclic olefinic hydrocarbon containing two double bonds per molecule in the presence of a halogen-containing catalyst selected from the group consisting of a halogen, a hydrogen halide, a halohydrocarbon, a halogenated carboxylic acid, and an acyl halide.

A further embodiment of this invention relates to a process which comprises reacting a monocyclic terpenic hydrocarbon and a halogen-containing catalyst at a temperature of from about 100° to about 400° C.

We have found that hydrogen disproportionation occurs when a hydrocarbon selected from the group consisting of a monocyclic terpene and a monocyclic olefinic hydrocarbon containing two double bonds per molecule is reacted in the presence of a homogeneous catalyst comprising a halogen. Thus we observed that limonene when treated with hydrogen bromide at an elevated temperature or upon being heated at 170° C. in the presence of 2 mole per cent of dibromolimonene underwent disproportionation of hydrogen to such an extent that formation of about 50% each of p-cymene and monocyclic monoolefinic hydrocarbons occurred during a period of four hours. This treatment of limonene with dibromolimonene yielded practically no polymers of limonene but only the aforementioned p-cymene and dihydrolimonene. The reaction which occurred may thus be expressed by the following equation:

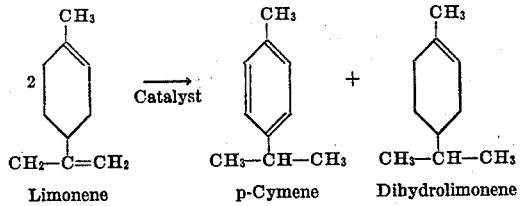

Limonene     p-Cymene     Dihydrolimonene

The type of disproportionation thus observed for limonene occurs also with various other cyclic olefins and particularly with those having at least 2 double bonds per molecule such as terpinene, vinyl cyclohexene, and a mixture of unsaturated cyclic hydrocarbons sometimes referred to as "organic diluent" and recovered from acid-acting catalysts after use in hydrocarbon conversion reactions such as alkylation and polymerization. The reaction forming aromatic hydrocarbons also proceeds more easily with cyclic olefins and monocyclic terpenes in which the cyclic ring contains six carbon atoms.

Catalysts utilizable for the process of our invention are preferably those which do not have pronounced polymerizing properties. Halogen-containing catalysts which we prefer in our process are selected from the group consisting of a halogen, a hydrogen halide, a halohydrocarbon, a halogenated carboxylic acid, and an acyl halide. In general, these different catalytic materials contain a hydrogen halide or, under the conditions of the reaction, are capable of forming a hydrogen halide. Iodine, in particular is a halogen which may also be utilized as catalyst in the conversion of terpenic hydrocarbons into aromatic hydrocarbons and alkyl cyclohexene hydrocarbons.

The following data are given to illustrate the process of the invention although with no intention of limiting unduly its generally broad scope.

Several runs were made in which a monocyclic terpenic hydrocarbon and a halide catalyst were heated under reflux for a period of 3 to 6 hours. Limonene and 1-methyl-4-isopropyl-1-cyclohexene were the unsaturated cyclic hydrocarbons so treated with iodine and several organic halogen compounds containing chemically combined bromine and chlorine. In some of these runs the formation of aromatic hydrocarbons was accompanied by the production of polymers. The unsaturated cyclic hydrocarbons treated in these runs, the catalysts, the operating conditions used, and the yields of aromatic hydrocarbons are given in the following table:

| Catalyst Used | | Temp., °C. | Duration of Heating, Hours | Mole, per cent of Limonene Converted to— | |
|---|---|---|---|---|---|
| Kind | Mole, per cent | | | Aromatics | Higher Boiling Hydrocarbons |
| Dibromolimonene [1] | 3 | 178 | 4 | 45 | 6 |
| Iodine | 2 | 178 | 4 | 48 | 12 |
| Monochloroacetic Acid | 6 | 174 | 4 | 3 | 5 |
| Dichloroacetic Acid | 4 | 178 | 4 | 9 | 6 |
| Trichloroacetic Acid | 4 | 178 | 4 | 25 | 24 |
| Dibromolimonene [1] | [2]3 | 176 | 6 | 5 | — |

[1] This was 1, 8-dibromo-p-menthane prepared by the action of hydrogen bromide on limonene in acetic acid solution.
[2] 1-methyl-4-isopropyl-1-cyclohexene instead of limonene was charged in this reaction.

From the above indicated results it is noted that the catalysts most effective in promoting the hydrogen disproportionation reaction included iodine and 1,8-dibromo-p-menthane, also referred to in the table as dibromolimonene.

The foregoing specification and numerical results indicated the character of the present process although it is not intended that either section should limit unduly the broad scope of the invention.

We claim as our invention:

1. A process for producing p-cymene which comprises reacting limonene at substantially liquid phase conditions and a temperature in excess of 100° C. but not greater than about 400° C. in the presence of a catalytic amount of iodine.

2. A process for producing p-cymene which comprises reacting limonene at substantially liquid phase conditions and a temperature in excess of 100° C. but not greater than about 400° C. in the presence of a catalytic amount of a bromolimonene.

3. A process for producing p-cymene which comprises reacting limonene at substantially liquid phase conditions and a temperature in excess of 100° C. but not greater than about 400° C. in the presence of a catalytic amount of a chlorocarboxylic acid.

4. A process for the production of aromatic hydrocarbons which comprises reacting a monocyclic olefinic hydrocarbon containing two double bonds per molecule in the presence of a catalytic amount of a homogeneous halogen-containing catalyst selected from the group consisting of a halogen, a hydrogen halide, a halohydrocarbon, a halogenated carboxylic acid, and an acyl halide, at substantially liquid phase conditions and a temperature in excess of 100° C. but not greater than about 400° C.

5. The process of claim 4 further characterized in that said monocyclic olefinic hydrocarbon contains six carbon atoms in the cyclic ring.

6. A process for the production of aromatic hydrocarbons which comprises reacting a monocyclic terpenic hydrocarbon containing two double bonds per molecule in the presence of a catalytic amount of a homogeneous halogen-containing catalyst selected from the group consisting of a halogen, a hydrogen halide, a halohydrocarbon, a halogenated carboxylic acid, and an acyl halide, at substantially liquid phase conditions and a temperature in excess of 100° C. but not greater than about 400° C.

7. The process of claim 4 further characterized in that said catalytic amount is not greater than about 6 mol per cent of said monocyclic olefinic hydrocarbon.

VLADIMIR N. IPATIEFF.
HERMAN PINES.

REFERENCES CITED

The following references are of record in the file of this patent:

UNITED STATES PATENTS

| Number | Name | Date |
| --- | --- | --- |
| 1,433,666 | Stalmann | Oct. 31, 1922 |
| 1,289,444 | Gottschalk | Dec. 31, 1918 |
| 1,463,122 | Logan | July 24, 1923 |
| 1,691,066 | Humphrey | Nov. 13, 1926 |
| 2,097,743 | Sheffield | Nov. 2, 1937 |

FOREIGN PATENTS

| Number | Country | Date |
| --- | --- | --- |
| 142,738 | Great Britain | May 13, 1920 |

OTHER REFERENCES

Egloff et al., Isomerization of pure hydrocarbons, pages 328–9 (1942). (Copy in Division 31.)